US007930905B2

(12) United States Patent
Stirling et al.

(10) Patent No.: US 7,930,905 B2
(45) Date of Patent: Apr. 26, 2011

(54) METHODS FOR MANUFACTURING LOW WATER PEAK OPTICAL WAVEGUIDE INCORPORATING A POROUS CORE MANDREL

(75) Inventors: David McDonald Stirling, Killara (AU); Franklin W. Dabby, Los Angeles, CA (US); Gordon Randall Gould, Oxnard, CA (US); Henry Willner, Long Beach, CA (US)

(73) Assignee: ASI/Silica Machinery, LLC, North Hills, CA (US)

( * ) Notice: Subject to any disclaimer, the term of this patent is extended or adjusted under 35 U.S.C. 154(b) by 0 days.

(21) Appl. No.: 10/961,284

(22) Filed: Oct. 8, 2004

(65) Prior Publication Data

US 2006/0075786 A1    Apr. 13, 2006

(51) Int. Cl.
*C03B 37/014* (2006.01)
(52) U.S. Cl. ................. 65/393; 65/439; 65/421; 65/422; 65/426; 65/427
(58) Field of Classification Search .................... 65/439, 65/393, 421, 422, 417, 426, 427, 429, 395, 65/440
See application file for complete search history.

(56) References Cited

U.S. PATENT DOCUMENTS

| | | | | |
|---|---|---|---|---|
| 4,494,968 A | * | 1/1985 | Bhagavatula et al. | 65/386 |
| 4,501,601 A | * | 2/1985 | Haupt | 65/399 |
| 4,810,276 A | * | 3/1989 | Gilliland | 65/421 |
| 6,477,305 B1 | * | 11/2002 | Berkey et al. | 385/123 |
| 6,931,188 B2 | * | 8/2005 | Kersey et al. | 385/125 |
| 2007/0062337 A1 | * | 3/2007 | Dai et al. | 76/108.1 |

FOREIGN PATENT DOCUMENTS

| | | | |
|---|---|---|---|
| JP | 61291432 A | * | 12/1986 |
| JP | 63017236 A | * | 1/1988 |
| JP | 04325431 A | * | 11/1992 |

OTHER PUBLICATIONS

T. Moriyama, et al., "Optical Fibres & Waveguides", Electronics Letters, vol. 16 No. 18, dated Aug. 28, 1980, pp. 698-699.
International Search Report and Written Opinion for International Application No. PCT/US05/35952 completed Jul. 13, 2006.

* cited by examiner

*Primary Examiner* — Queenie Dehghan
(74) *Attorney, Agent, or Firm* — Alston & Bird LLP

(57) ABSTRACT

A method of manufacturing a cylindrical glass optical waveguide preform having a low water content centerline region, for use in the manufacture of optical waveguide fiber, is disclosed. The centerline region of the glass optical waveguide preform has a water content sufficiently low such that an optical waveguide fiber producible from the glass optical waveguide preform of the present invention exhibits an optical attenuation of less than about 0.35 dB/km, and preferably less than about 0.31 dB/km, at a measured wavelength of 1380 nm. Method of manufacture of a porous core mandrel used in the manufacture of such a glass optical waveguide preform is also disclosed.

44 Claims, 8 Drawing Sheets

METHODS FOR MANUFACTURING LOW WATER PEAK OPTICAL WAVEGUIDE INCORPORATING A POROUS CORE MANDREL

BACKGROUND OF THE INVENTION

The present invention relates generally to the field of optical waveguide fibers, and more particularly to optical waveguide preforms and methods of making optical waveguide preforms, from which low water peak optical waveguide fibers are formed.

A significant goal of the telecommunications industry is to transmit greater amounts of information over longer distances, in shorter periods of time. Over time there has also typically been an increase in the usage of telecommunication systems, by users and by system resources. This has resulted in demands for increased bandwidth in the media used to carry this information over long distances, in particular for optical waveguide fibers which are contained in telecommunication cables.

Bandwidth in optical waveguide fibers is dependent on a number of factors, such as the attenuation of the fiber at the transmission wavelength. Impurities present in the light guiding region of the fiber can increase the attenuation of the fiber, due to absorption of the transmitted light. Of particular importance is the attenuation caused by the hydroxyl radical (OH), which can be bonded to the fiber structure during the manufacturing process. The presence of OH bonds in the light guiding region of the fiber can cause an attenuation increase, with a peak in a window around 1380 nm, also generally referred to as the water peak. The 1380 nm window is defined as the range of wavelengths between about 1330 nm to about 1470 nm; with the peak attenuation effect typically around 1383 nm.

In the past, telecommunications systems avoided using the water peak region, partly due to the lack of optical waveguide fiber with low water peaks. In recent times, however, fiber manufacturers have been producing low water peak fibers, by various methods, which has coincided with the development of telecommunication systems which increasingly use all the wavelengths between about 1300 nm and 1650 nm. In order for telecommunication systems to fully utilize this wavelength range, removal of the water peak from the optical waveguide fiber is essential.

There are three main methods of optical waveguide preform manufacture in common use. The three techniques have similar methods of vapor generation and oxidation, but differ in the geometry of the substrate on which the oxide soot is deposited;

(i) Deposition in Tube Methods

These methods comprise techniques known as MCVD (Modified Chemical Vapor Deposition) and PCVD (Plasma Chemical Vapor Deposition). In these techniques, a vapor stream is introduced to the end of a high-purity quartz tube, and the oxides are deposited on the inner surface of the tube.

(ii) VAD (Vapor Axial Deposition)

In this technique, the deposition takes place on a vertically mounted rotating mandrel and the preform is "grown" axially in the vertical plane, from a short stub into a longer, cylindrical preform.

(iii) OVD (Outside Vapor Deposition)

In this technique, silica-based soot is deposited on a rotating target rod. The rod builds up to form a cylindrical soot preform, which can be sintered and dried to form a glass preform.

Although the methods and embodiments of the present invention are generally applicable to all of the above techniques, it is particularly applicable to optical waveguide preforms manufactured using the OVD process.

SUMMARY OF THE INVENTION

The present invention relates to methods of manufacturing a porous core mandrel, for use in fabricating of a low water glass optical waveguide preform. The glass optical waveguide preform is used to manufacture low water peak optical waveguide fiber. The manufacture of doped silica products is described. All the processes described herein are equally applicable to the manufacture of non-doped silica products in the case where silica-based reaction products contain no dopants.

One aspect of the present invention relates to a method of fabricating a porous core body which comprises steps of chemically reacting at least some of the constituents of a moving fluid mixture with at least one glass forming precursor compound in an oxidizing medium to form a silica-based reaction product. At least a portion of the reaction product, which contains hydrogen bonded to oxygen, is collected or deposited to form a silica-based porous core body which preferably comprises a dopant such as germanium dioxide. The porous core body thus formed is typically subjected to a heat treatment in a furnace, during which a gas mixture may be passed through the furnace, which partially dries and compacts the porous core body. Upon removal of the partially compacted porous core body from the furnace, a porous core mandrel is created from the porous core body, using a boring or grinding tool. Other methods such as sawing or drilling can be used.

In another aspect of the present invention, the porous core mandrel, which preferably contains a dopant, is attached to handles and a single coating of dopant-free silica soot is deposited on the mandrel by the OVD method, so that a porous core preform is formed. The porous core preform is then chemically dried and sintered to form a glass core preform.

In another aspect of the present invention, two coatings of silica-based soot are deposited on the porous core mandrel, the first of which contains a dopant and the second of which does not contain a dopant, forming a porous core preform. The porous core preform is then chemically dried and sintered to form a glass core preform.

In a further aspect of the present invention, an undoped porous core mandrel is attached to handles and a single coating of undoped silica soot is deposited on the mandrel by the OVD method, so that an undoped porous core preform is formed. The undoped porous core preform is then chemically dried and sintered to form a pure silica glass core preform. These preforms can be drawn into smaller diameter pure silica rods or pure silica fiber or other low water content pure fused silica products.

In another aspect of the present invention, the glass core preform is drawn into glass core rods which function as a substrate for the further deposition of cladding silica soot by the OVD method to form a porous optical waveguide preform. The porous optical waveguide preform is chemically dried and sintered, to form a glass optical waveguide preform, so that the optical waveguide fiber producible from these preforms exhibits an optical attenuation of less than about 0.35 dB/km, and preferably less than about 0.31 dB/km, at a measured wavelength of about 1380 nm.

In another aspect of the invention, the glass core preform comprises a doped centerline region of such dimensions that it forms a glass optical waveguide preform and is directly drawn to optical waveguide fiber, where the fiber producible from these preforms exhibits an optical attenuation of less than about 0.35 dB/km, and preferably less than about 0.31 dB/km, at a measured wavelength of about 1380 nm.

In another aspect, a method of manufacturing a glass core preform includes the steps of boring a porous core body to form a porous core mandrel, depositing a silica-based material on the porous core mandrel to form a porous core preform, and drying and sintering at least a portion of the porous core preform to form a glass core preform.

In another aspect, a method of manufacturing a glass optical waveguide preform includes the steps of boring a porous core body to form a porous core mandrel, depositing a silica-based material on the porous core mandrel to form a porous optical waveguide preform, and drying and sintering at least a portion of the porous optical waveguide preform to form a glass optical waveguide preform.

The methods disclosed herein result in a number of advantages over other methods known in the art, including the following:

1. The traditional OVD method of core preform production requires the use of a removable substrate which forms a centerline hole; this hole remains in the glass core preform after drying and sintering. The water peak is largely a result of water being trapped in the glass during the fiber manufacturing process, and in the case of the OVD process it is believed that a large portion of the water is trapped in the centerline hole region prior to the hole being closed. The most common cause of the water being trapped in the centerline hole is through rewetting of the glass, by exposure to an atmosphere that contains a hydrogen containing compound, such as, but not limited to, water. The present method produces an OVD core preform with no centerline hole in the core region, eliminating the rewetting mechanism.

2. The traditional OVD method of core rod production closes the centerline hole in the core preform by applying a vacuum along the centerline hole during the core rod drawing process. The conventional method can cause core rod losses, due to the formation of voids or bubbles along the centerline during incomplete hole closure. Additionally, the hole closure process may be non-circular, potentially causing issues with fiber properties. The present method does not have these issues.

3. The conventional closure of the core preform centerline hole usually requires the use of hollow silica handles, ground glass joints, vacuum pumps and associated pipework. In the present invention, as there is no hole to collapse, the costs and associated difficulties with hole closure are eliminated.

4. The closure of the centerline hole typically creates a dip in the refractive index profile of the core rod. The present method can result in more uniform refractive index profiles, as the dip in the center of the refractive index profile can be eliminated.

5. In one aspect of the present invention, the glass preform resulting from deposition on the porous core mandrel can be drawn directly into fiber without the additional stages of drawing into rods and further overcladding. This process eliminates a range of processing steps, and reduces manufacturing costs accordingly.

6. In one aspect of the present invention, the doped silica-based soot that is used to form the porous core body, from which the porous core mandrel is made, can be prepared by a non-OVD process. This process gives potential for a more efficient capture of doped silica-based soot than via the standard OVD deposition process. With the OVD deposition process, the capture efficiency of dopant chemicals, such as germanium tetrachloride, is usually less than 50% and often less than 30%. Using non-OVD methods to generate the doped silica-based soot and produce the porous core body can result in capture efficiencies of over 90% for this expensive raw material.

A principal advantage of the method is that the porous core preforms are completely porous, with no centerline hole, allowing the core preforms to be thoroughly chemically dried, with no problem of rewetting within the centerline region of the core preform. Accordingly, the optical waveguide fiber made from the optical waveguide preforms exhibit a much smaller water peak at 1380 nm, and exhibit a much lower attenuation in the 1380 nm window than optical waveguide fiber manufactured in accordance with the standard methods of the OVD process.

An additional advantage is that the optical waveguide fiber manufactured from optical waveguide preforms of the current invention can operate at any selected wavelength over a range of wavelength from about 1300 nm to about 1680 nm without undue optical attenuation.

DETAILED DESCRIPTION OF THE PREFERRED EMBODIMENTS

A cylindrical glass optical waveguide preform 38 from which optical waveguide fiber 39 is manufactured comprises a central core region comprising silica material, such as for example, glass, combined with a dopant (preferably germanium dioxide), surrounded by a cladding region comprising silica material, such as for example, glass. The core region preferably extends longitudinally along the central axis of the cylindrical optical waveguide preform.

Figure 1:
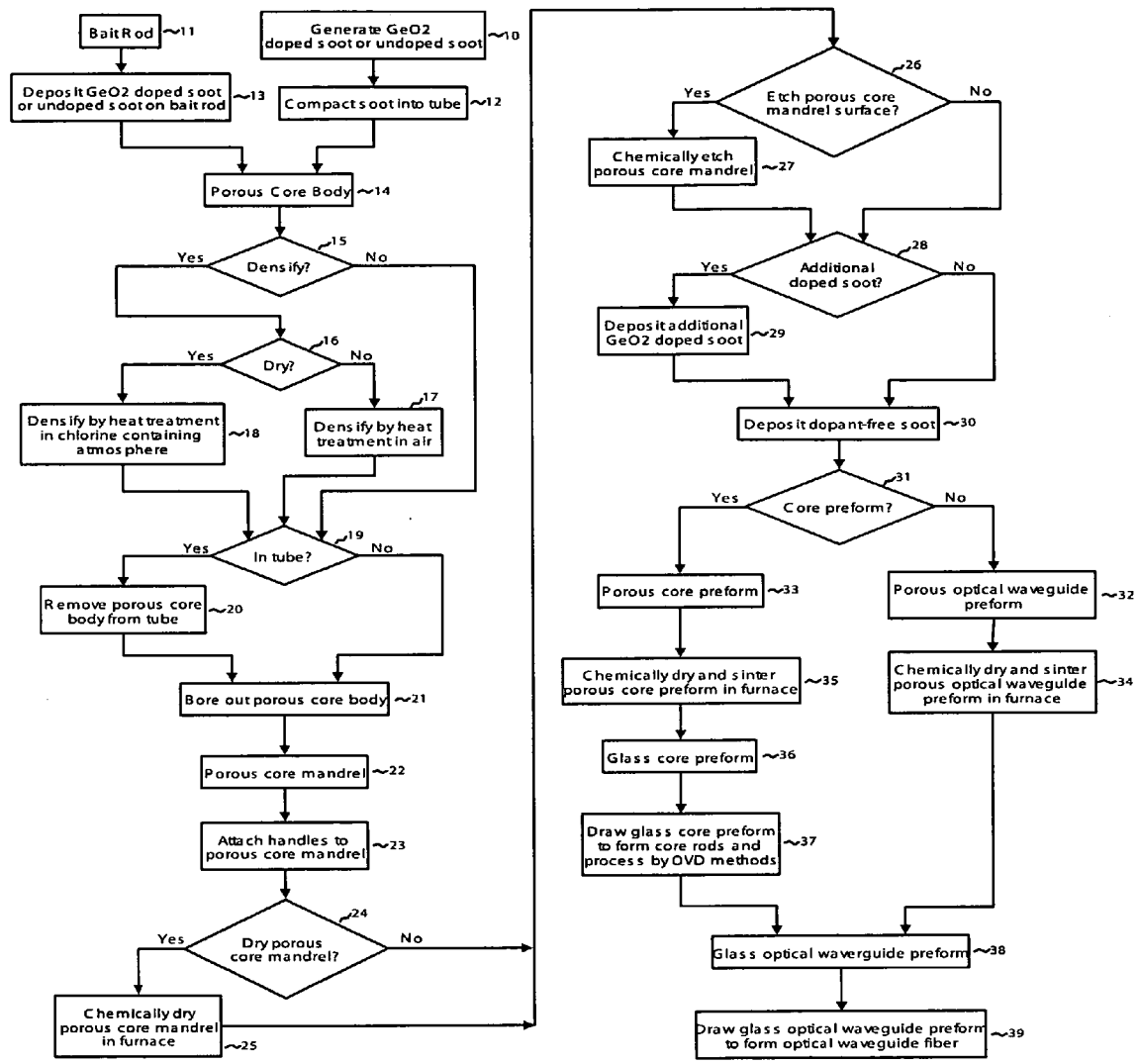
FIG. 1: Flow chart depicting one embodiment of a preferred method of manufacturing optical fiber in accordance with the present invention.
Figure 2:
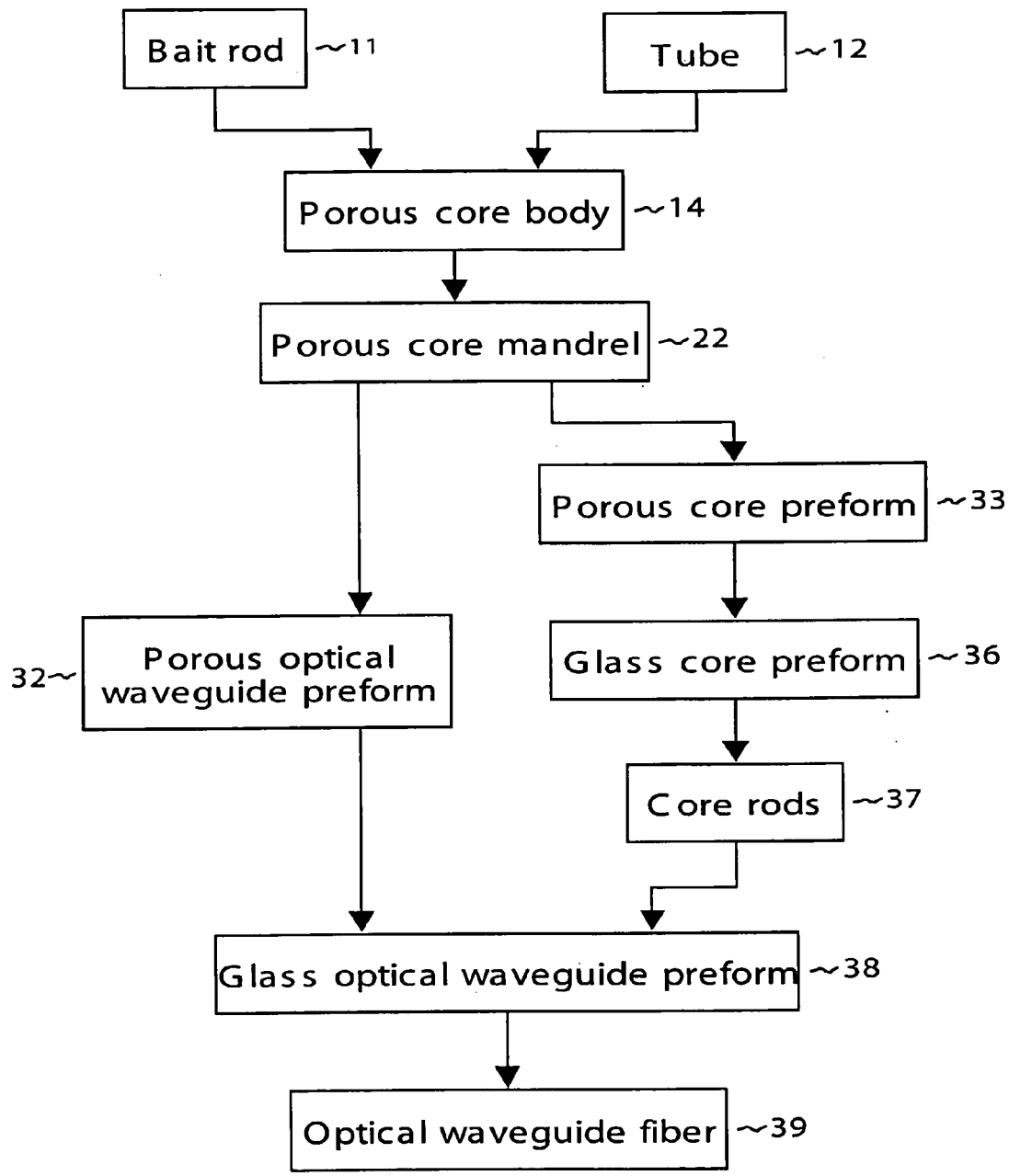
FIG. 2: Flow chart showing the product sequence in a method of the present invention.
Figure 3:
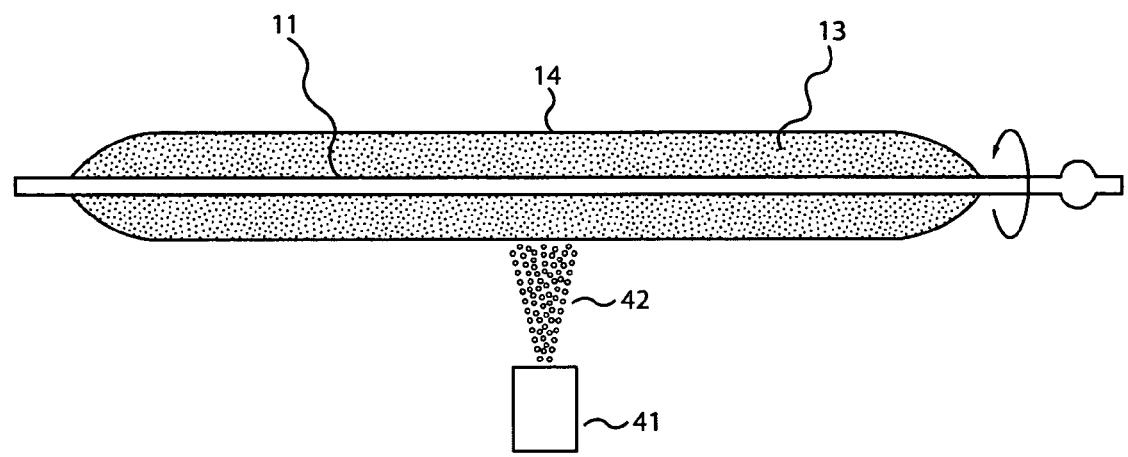
FIG. 3: Schematic illustrating the manufacture of a porous core body using an outside vapor deposition process in accordance with the method of the present invention.
Figure 4:
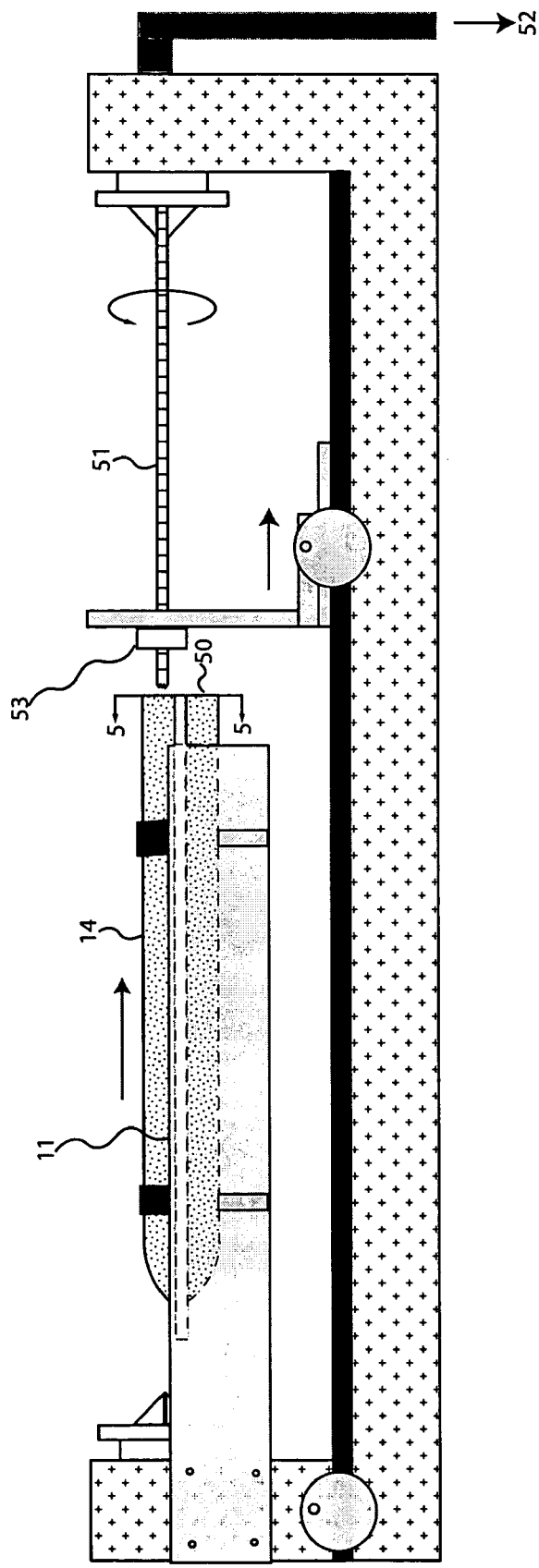
FIG. 4: Cross-sectional view illustrating the boring of a porous core mandrel from a porous core body.
Figure 5:
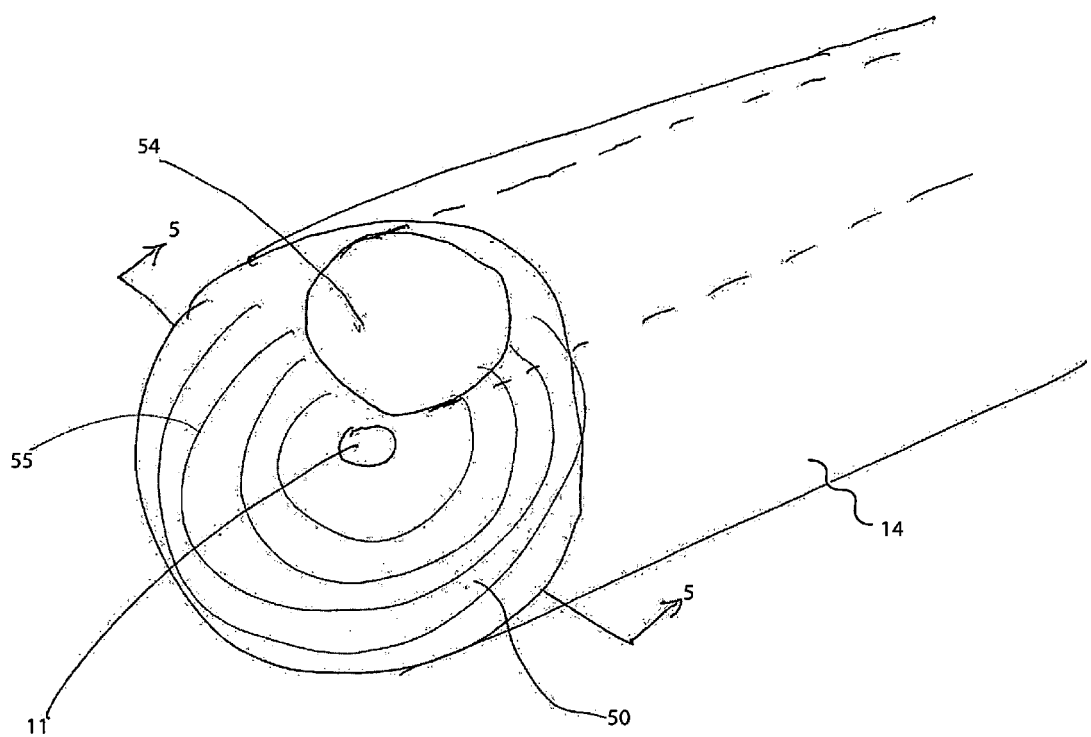
FIG. 5: Perspective view of a porous core body after boring a porous core mandrel.
Figure 6:
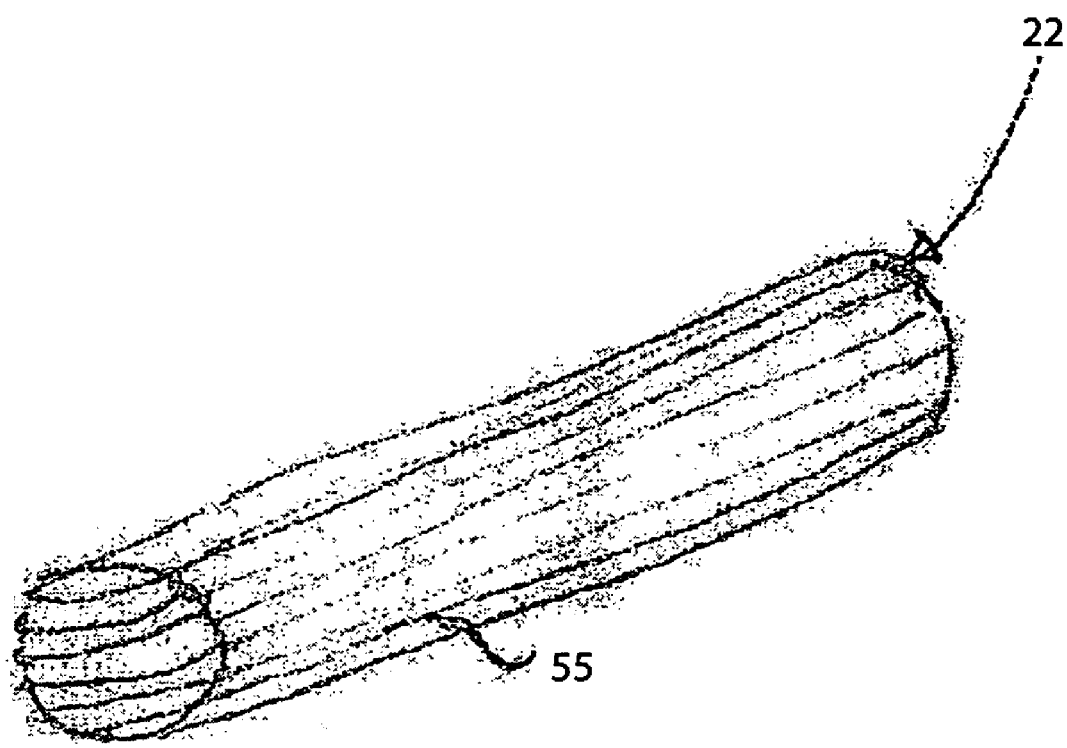
FIG. 6: Diagram of a porous core mandrel bored from a porous core body.
Figure 7:
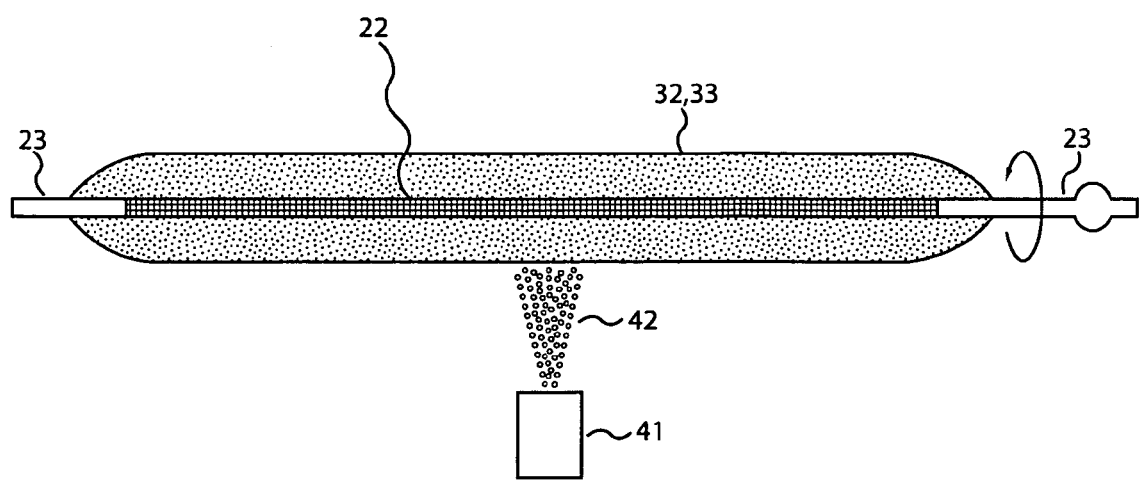
FIG. 7: Schematic illustrating the manufacture of a porous core preform from a porous core mandrel using an outside vapor deposition process in accordance with the method of the present invention.

In one preferred embodiment, the porous core body 14 is formed by chemically reacting at least some of the constituents of a moving fluid mixture comprising at least one glass-forming precursor compound in an oxidizing medium. The reaction results in the formation of a silica-based reaction product 42 which can be doped or undoped. At least a portion of this reaction product 42 is directed toward a bait rod 11, to form a porous body 14, at least a portion of which comprises hydrogen bonded to oxygen. The porous body 14 may be formed, for example, by depositing layers of silica-based reaction product 42, generally known as soot, onto a bait rod 11 via an OVD process 13 as shown in FIG. 3.

In the OVD process 13, a bait rod 11 is mounted on a lathe, which is designed to translate and rotate the bait rod 11, in close proximity to a soot-producing burner 41. As the bait rod 11 is rotated and translated, the soot 42 is directed toward the bait rod 11. At least a portion of the soot 42, which can be doped or undoped, is deposited on the bait rod 11 and handles to form a porous core body 14. Once the targeted quantity of soot has been deposited on the bait rod 11, the soot deposition preferably is terminated. Preferably, the porous core body 14 is positioned and rotated in a furnace for heat treatment. The porous core body 14 is preferably subjected to a temperature of about 1100 to 1250 deg C., which is sufficient to densify 15 or compact the porous soot, while still retaining its porosity. During this heat treatment process, the porous core body 14 is preferably chemically dried by exposing body 14 to a chlorine-containing atmosphere 18, which effectively removes water and other impurities from the porous core body 14. Alternately, during the heat treatment process, the porous core body 14 may be exposed to an air atmosphere 17. As the porous core body 14 was formed by the OVD method, body 14 comprises many soot layers 55, and the heat treatment reduces delamination of the soot layers during the formation of the porous core mandrel 22.

In another embodiment of a method of producing a porous core body 14, the doped silica-based soot from which the porous core body 14 is made, can be produced by a non-OVD process. In this embodiment, at least some of the constituents of a moving fluid mixture are chemically reacted, comprising at least one glass-forming precursor compound in an oxidizing medium to form a homogeneous doped silica-based reaction product. The product, generally known as soot 10, is in powder form. The soot is collected by suitable means, such as filtration, and transferred to a tube, which is preferably silica-based 12. During the transfer method, the powder material is compacted, to increase bulk density of the product and to retain the shape of the product during the heat treatment. In accordance with this method, the tube 12 comprising the compacted powder material is heat treated by positioning tube 12 within a furnace, and subjected tube 12 to a temperature of about 1100° to 1250° C., which in some cases is sufficient to further densify 15 or compact the porous soot, while still retaining porosity. During this heat treatment process, the porous core body 14 is preferably chemically dried by exposing body 14 to a chlorine-containing atmosphere 18, which effectively removes water and other impurities from the porous core body 14. Alternately, during the heat treatment process, the porous core body 14 may be exposed to an air atmosphere 17. In one aspect, the partly densified porous core body 14 shrinks during the heat treatment, allowing body 14 to be readily removed 20 from the tube 12 for further processing.

After the heat treated porous core body 14 is removed from the furnace, a porous core mandrel 22 is produced using a boring method 21. Preferably, one end of the porous core body 14 may be cut flat 50 using a glass saw, and the porous core body 14 may be positioned within a lathe that contains a boring tool 51. The boring tool 51, preferably having a nominal diameter of greater than about 7 mm, is used to bore a porous core mandrel 22 from the porous core body 14 leaving a hole 54. A vacuum 52 is preferably applied to the open end of the boring tool 51, to remove at least a portion of soot dust and prevent the boring tool 51 from clogging. The boring tool 51 preferably includes slots near the drill end for the soot dust to enter the inside of the boring tool 51 and be removed by vacuum 52. The boring tool 51 preferably is further supported at the drill end by a bearing support 53 to aid stability of the boring process. In one aspect, the density of the porous core body 14 is preferably between about 0.4 g/cm$^3$ and below about 0.7 g/cm$^3$ to allow the boring tool 51 to work effectively. If the porous core body 14 density is below about 0.4 g/cm$^3$, the porous soot is likely to break apart during the boring process, and the porous core mandrel 22 cannot be produced. If the porous core body 14 density is above about 0.7 g/cm$^3$, the boring tool 51 is likely to overheat during the boring process. The density of glassified silica-based soot is about 2.2 g/cm$^3$.

In one embodiment, the porous core mandrel 22 is taken straight to further overcladding 29,30 by the OVD process with no further processing.

In another embodiment, the porous core mandrel 22 is chemically dried 25, cleaned by positioning mandrel 22 within a furnace subjecting mandrel 22 to a temperature preferably of about 1100° C., and exposing mandrel 22 to a chlorine-containing atmosphere. This step effectively removes water from the porous core mandrel 22 and may assist in removing any contamination of the porous core mandrel 22 that occurred during the boring process.

In still another embodiment, the porous core mandrel 22 is exposed to a chemical etching agent 27, such as, but not limited to, HF. The chemical etching agent 27 removes a portion of the porous core mandrel 22 surface, which assists in smoothing the surface of the porous core mandrel 22 and removing at least some of the contamination that may have been present from the boring process 21. The chemical etching 27 can be separate from or in addition to chemically drying the porous core mandrel 22.

Once the bored porous core mandrel 22 is manufactured, silica glass handles 23 preferably are attached thereto to enable mandrel 22 to be mounted in an OVD lathe, which is designed to translate and rotate the porous core mandrel 22, in close proximity to a soot-producing burner 41. The soot is formed by chemically reacting at least some of the constituents of a moving fluid mixture comprising at least one glass-forming precursor compound in an oxidizing medium to form a silica-based reaction product 42. At least a portion of the soot 42 is deposited on the porous core mandrel 22 and handles 23, to form a porous core preform 33, at least a portion of which comprises hydrogen bonded to oxygen. Once the desired quantity of soot 42 has been deposited on the porous core mandrel 22, the soot deposition is terminated, and the porous core preform 33 is complete. In one embodiment, the soot deposited on the porous core mandrel 22 is dopant-free silica. In another embodiment, two coatings of silica-based soot 42 are deposited on the porous core mandrel 22, the first of which coating comprises a dopant (preferably germanium dioxide) of a level that is chosen to match the dopant level of the porous core mandrel 22, and the second of which coating comprises dopant-free silica.

In accordance with one preferred embodiment, the porous core preform 33 is positioned within a sintering furnace and rotated, where preform 33 is chemically dried 35 at a temperature of preferably about 1100° C. in an atmosphere of chlorine and helium. Following drying, the porous core preform 33 preferably is driven down into the hot zone of the sintering furnace preferably in an inert gas atmosphere, such as helium, and then sintered 35 at an elevated temperature, preferably at about 1500° C. to thereby form a sintered glass core preform 36.

In one embodiment, the solid glass core preform 36 is taken to a core rod drawing furnace, where preform 36 is drawn into a number of reduced diameter core rods 37. As the glass core preform 36 is solid glass, without a centerline hole, there is no need for the application of vacuum to the preform during core rod 37 drawing, as there is no possibility of the centerline region being rewet by exposure to the ambient atmosphere and there is no need to close a hole. The glass core rods 37 are further processed by the OVD method into glass optical waveguide preforms 38, which are then drawn to optical waveguide fiber 39.

In another embodiment, after deposition 29,30 on the porous core mandrel 22, the dimensions of the core region and the cladding region are such that they form a porous optical waveguide preform 32. The porous optical waveguide preform 32 is positioned within a sintering furnace and rotated, where preform 32 is chemically dried 34 at a temperature of preferably about 1100° C. in an atmosphere of chlorine and helium. Following drying, the porous optical waveguide preform 32 is driven down into the hot zone of the sintering furnace, preferably in an inert gas atmosphere, such as helium, and then sintered 34 at an elevated temperature, preferably about 1500° C. to thereby form a dried and sintered 34 glass optical waveguide preform 38, which is directly drawn to optical waveguide fiber 39.

Figure 8:
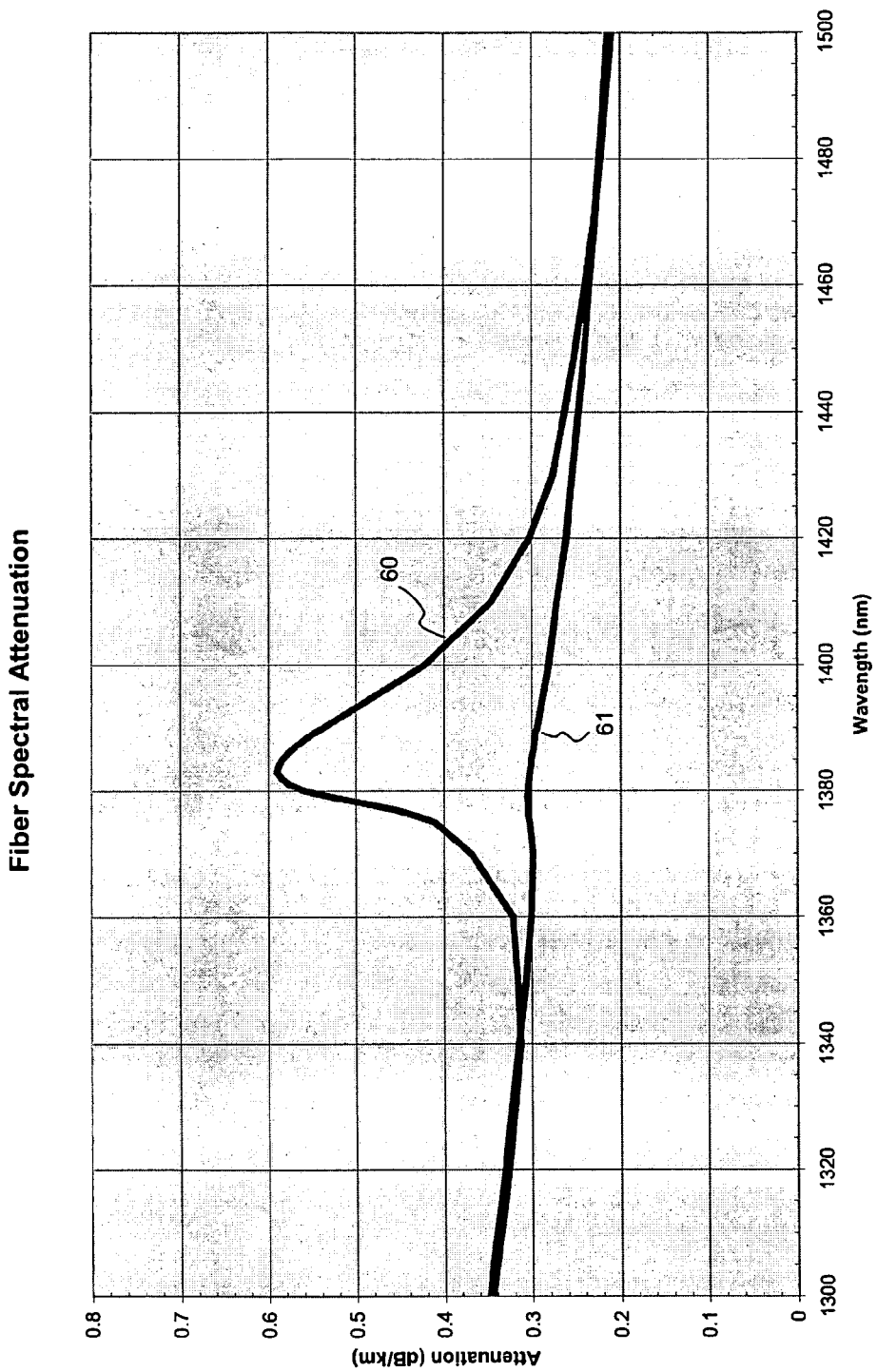
FIG. 8: A spectral attenuation plot of an optical waveguide fiber which contains a water peak, and an optical waveguide fiber with a low water peak.
Figure 1:
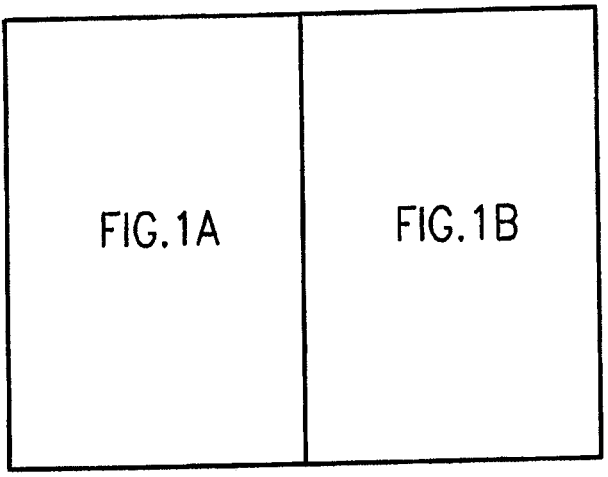
Figure 1A:
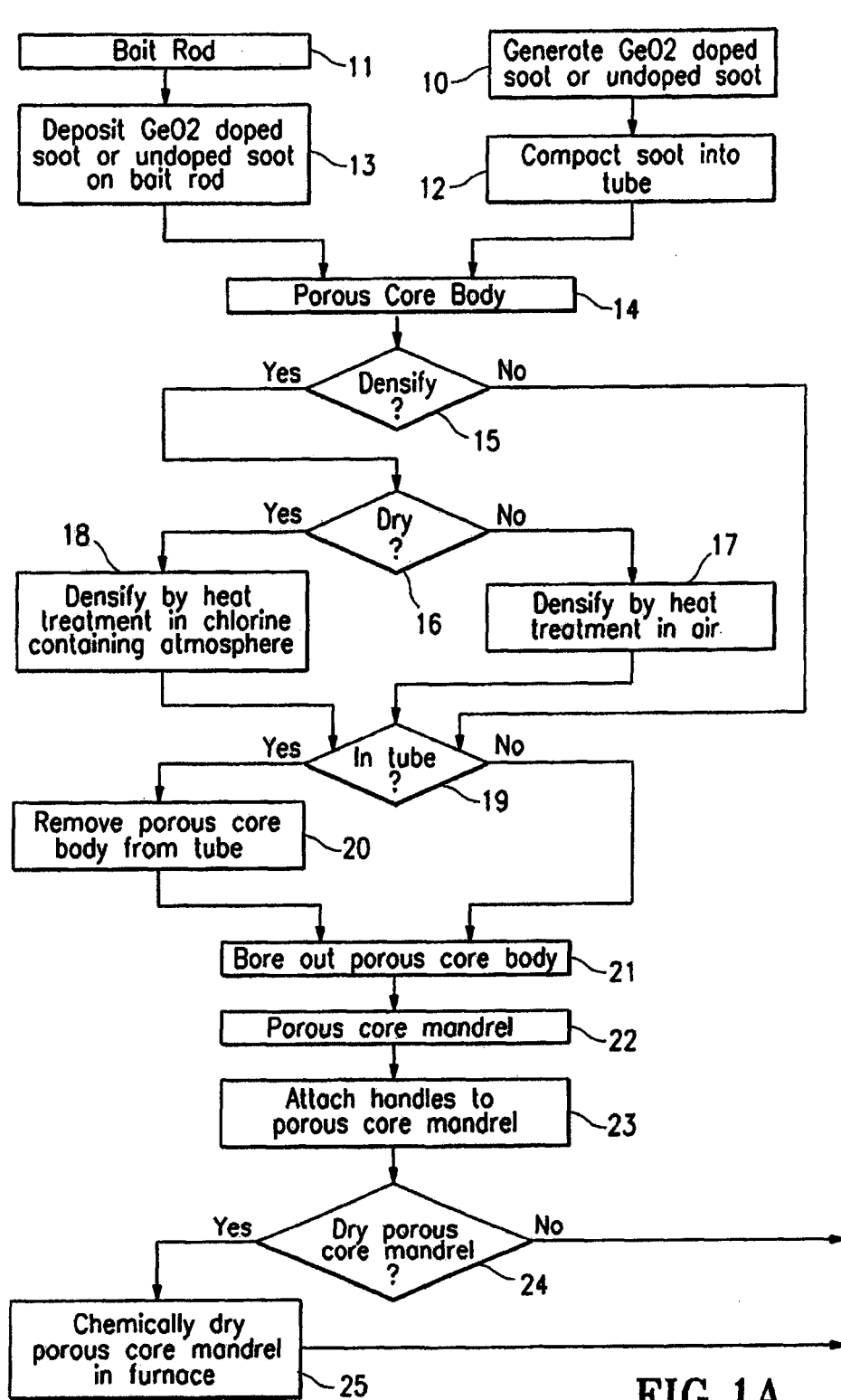
Figure 1B:
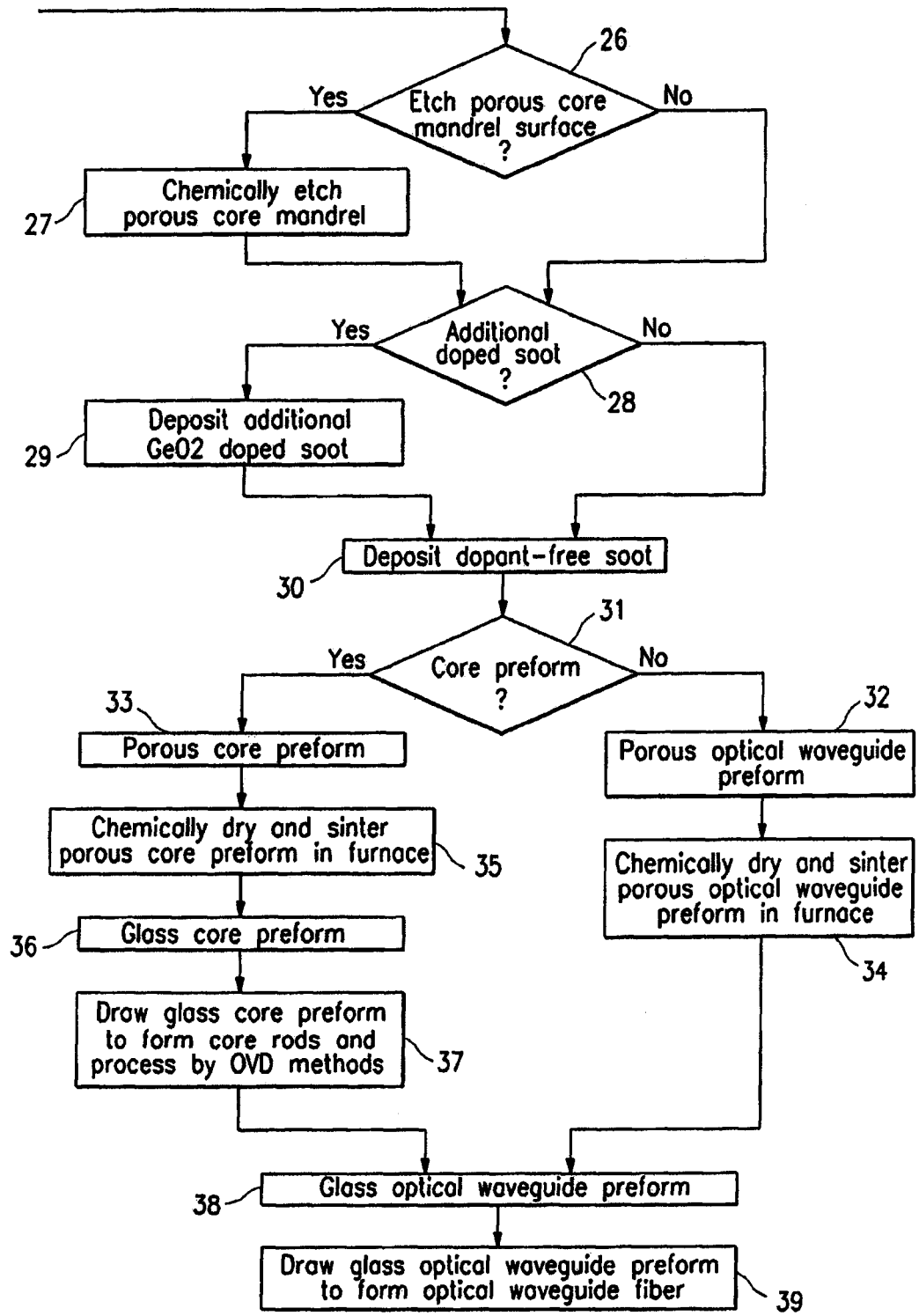
Figure 2:
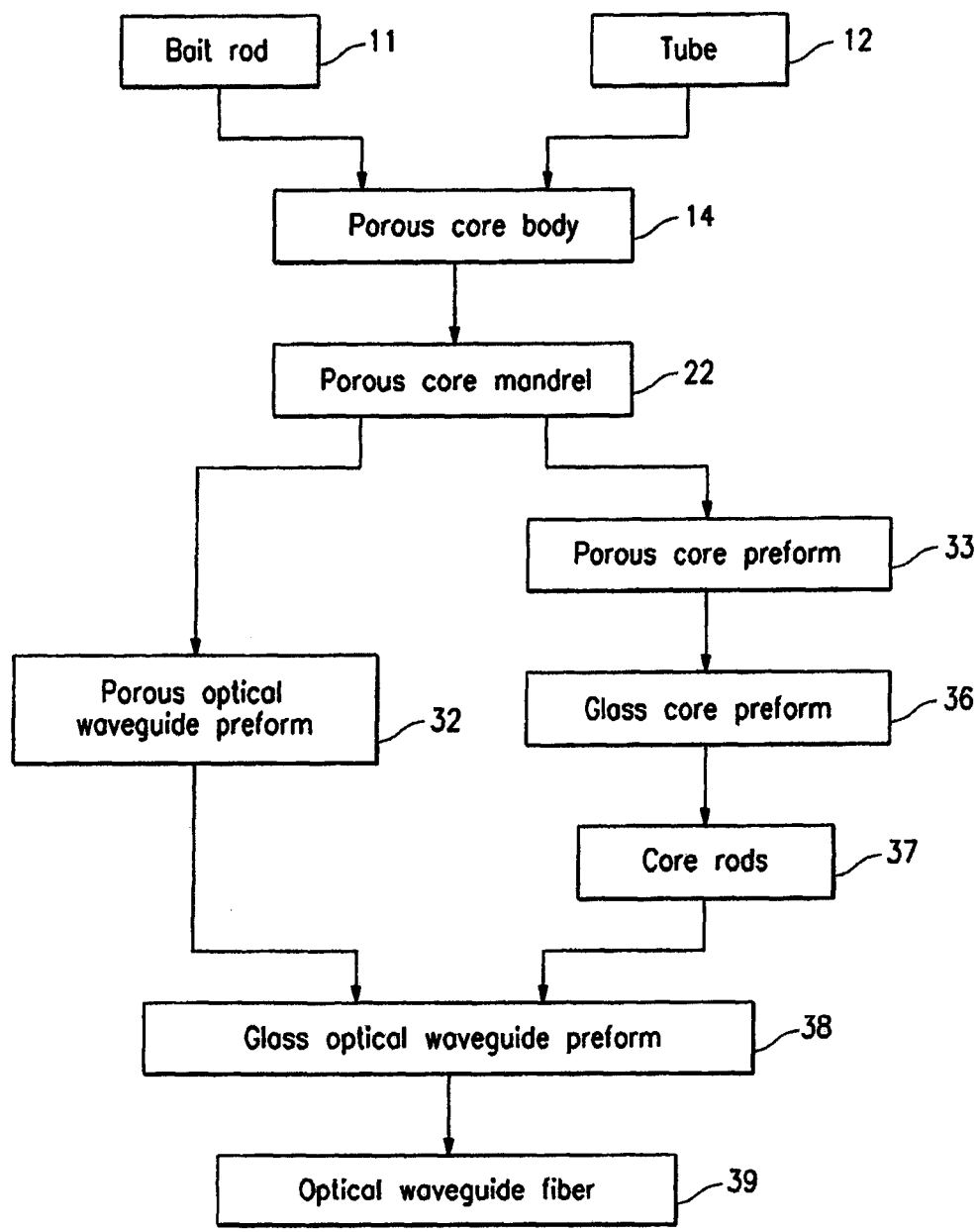
Figure 3:
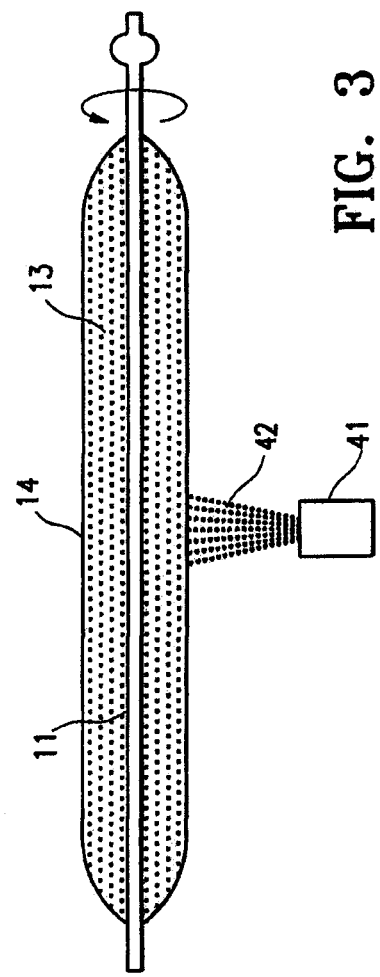
Figure 4:
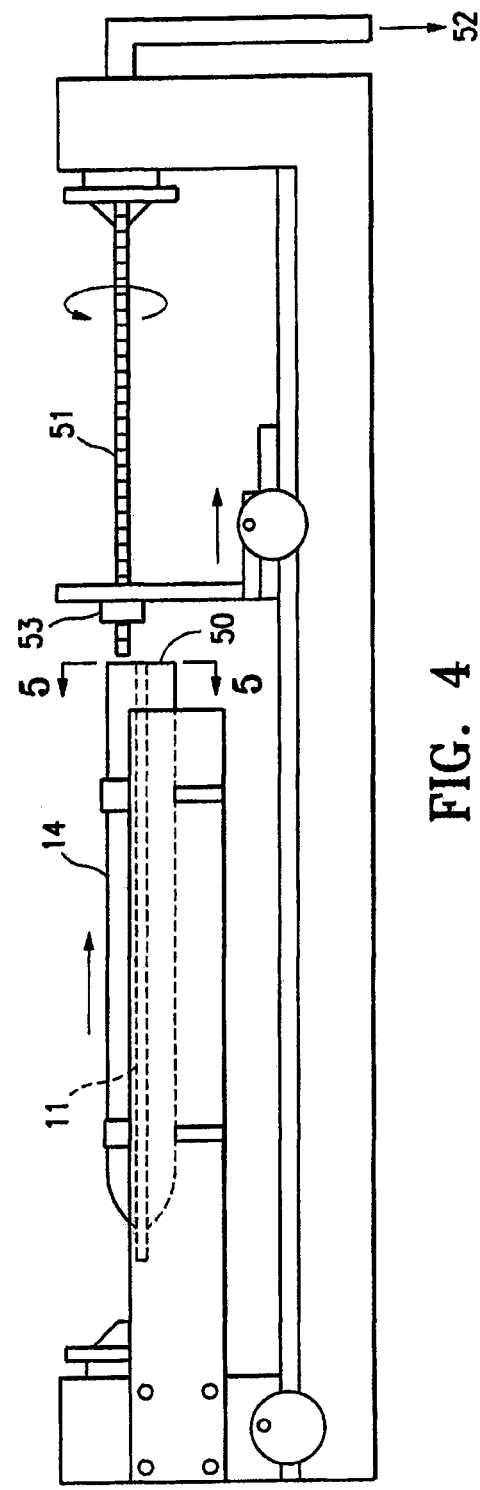
Figure 6:
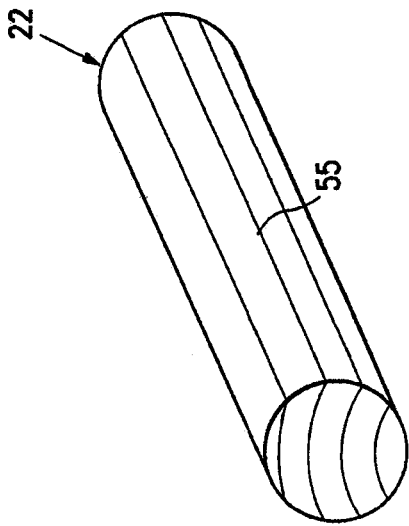
Figure 7:
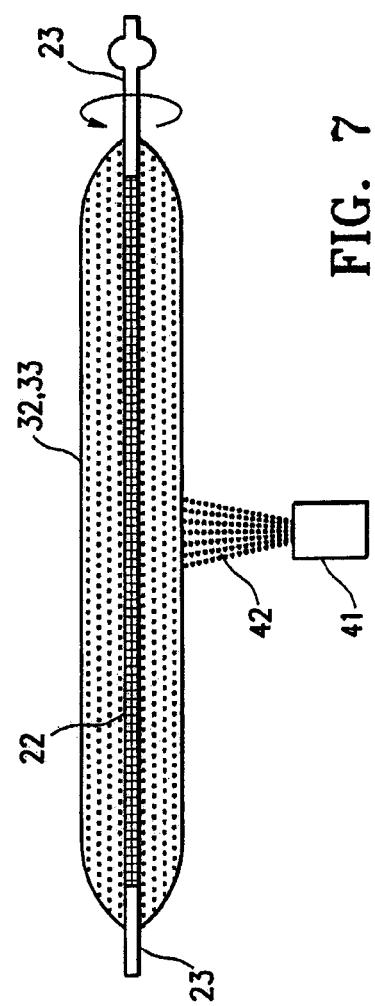
Figure 5:
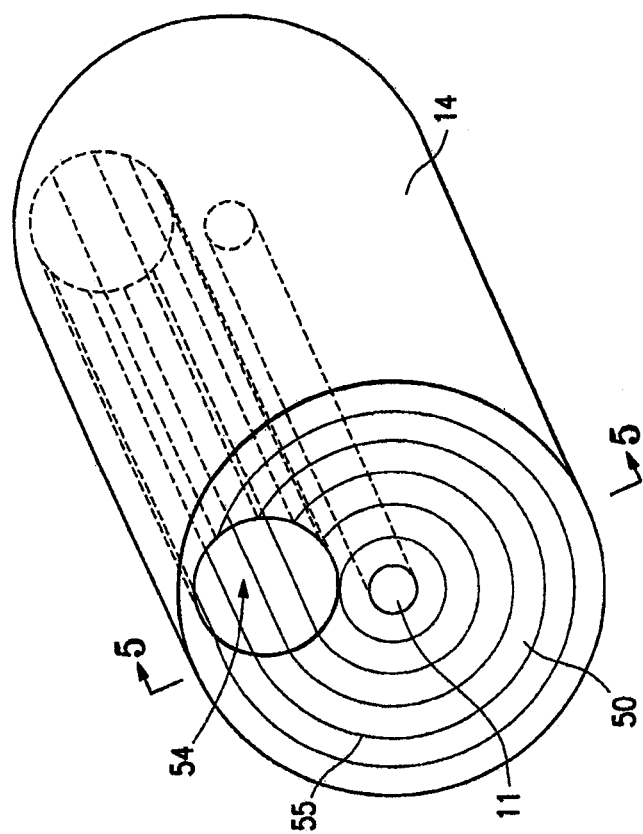
Figure 8:
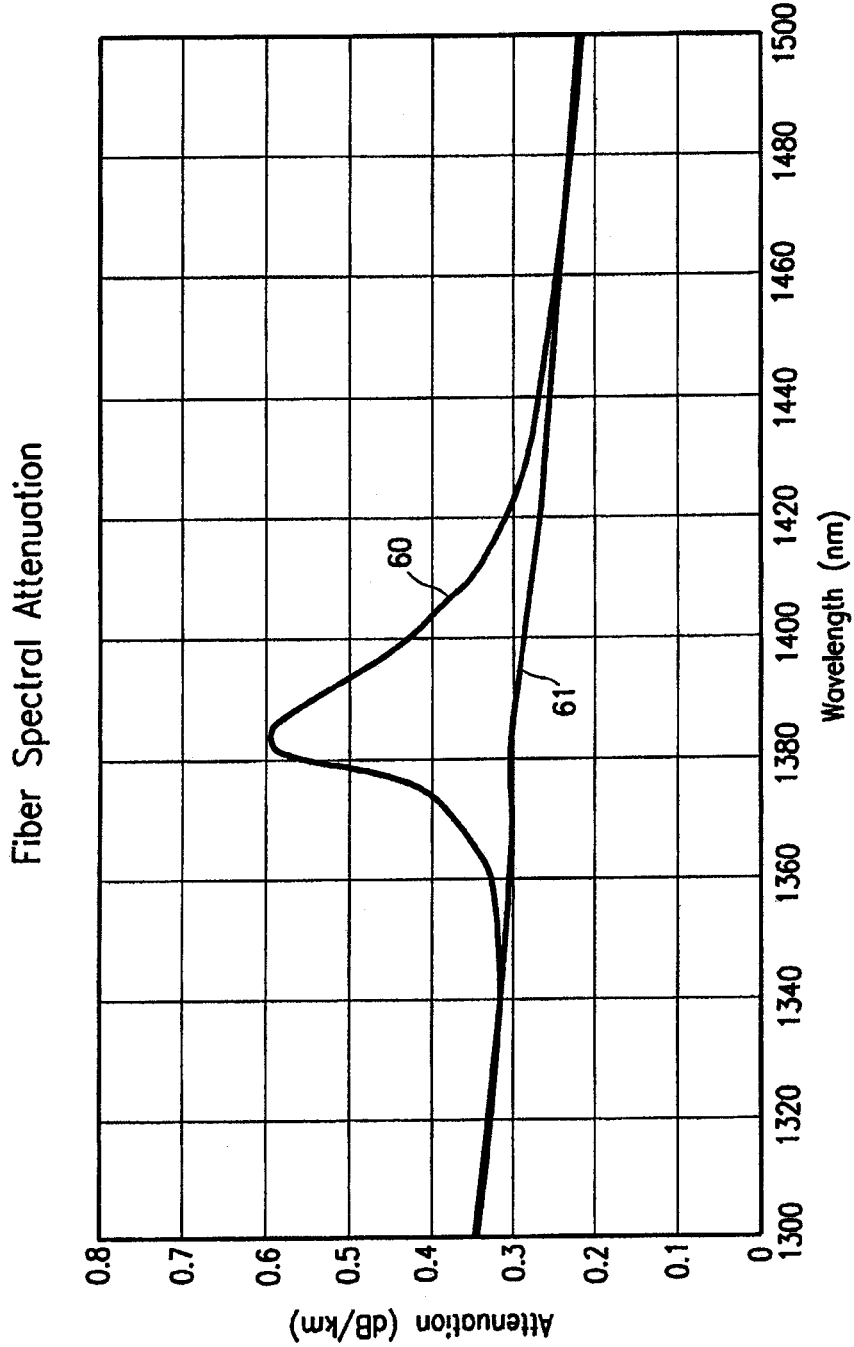

FIG. 8 shows the spectral attenuation of an optical waveguide fiber 39, which exhibits, for example, a high water peak 60 at 1380 nm. FIG. 8 also shows a low water peak 61 for an optical waveguide fiber 39 producible according to the methods disclosed herein such that the attenuation is less than about 0.31 dB/km at a wavelength of about 1380 nm.

In the glass core preform 36, voids or seeds may be visible at the interface of the porous core mandrel 22 and the deposited soot 42. These voids are the result of the deposition of soot on an imperfectly smooth porous core mandrel 22 surface, and are visibly reduced or eliminated upon subjecting the glass core preform 36 to extended heat, such as occurring during diameter reduction during core rod 37 formation or optical waveguide fiber 39 formation or firepolishing.

In one example, soot 42 is deposited onto a 1.4 meter long silica glass rod substrate 11 deposited using the OVD process, forming a one meter long porous core body 14, where the soot on the porous core body 14 has a density of about 0.32 grams per cubic centimeter. The porous core body 14 is loaded into a sintering furnace, and heat treated 17 at a temperature of about 1250° C. for about 6 hours in an air atmosphere. After heat treatment 17, the soot density on the porous core body 14 may increase to about 0.60 grams per cubic centimeter. The porous core body 14 may be bored 21 using a boring tool 51 with vacuum 52 attached, running at about 75 rpm and driven forward through the body at about 25 mm/min, to produce a porous core mandrel 22 of about 50 cm in length and about 20 mm diameter. Silica handles 23 may be attached to the porous core mandrel 22, and the porous core mandrel 22 assembly may then be mounted on an OVD lathe. Silica-based soot 42 is deposited on the entire porous core mandrel 22 and part of the handles 23 by an OVD process, with the density of the initial soot layers being made as close as practical to the density of the porous core mandrel 22. The soot deposition may be continued until the desired weight is reached, which may create the porous core preform 33. The porous core preform 33 may be loaded into the top furnace of a sintering furnace and maintained at a temperature of 1100° C. for about 6 hours, during which preform 33 may be dried using a flow of about 1.75 slpm chlorine and about 40 slpm helium 35. After drying, 35 the preform may be downfed into a hot zone of the furnace of about 1500° C., at a rate of about 5 mm/min, with a chlorine flow of about 0.1 slpm and a helium flow of about 40 slpm in the muffle tube and sintered 35. After being fully downloaded, the sintered glass core preform 36 is formed, after which preform 36 is withdrawn from the furnace. The glass core preform 36 may have a diameter of about 70 mm. In one aspect, minute voids may be observed at an interface where the soot is deposited on the porous core mandrel 22. These voids may be substantially reduced in number and size upon attaching the glass core preform 36 to a glass lathe and subjecting preform 36 to a high temperature hydrogen/oxygen flame, while drawing it into core rods 37 of about 22 mm diameter. Reduction of the core rod 37 size to about 3 mm diameter may reduce the interface voids, as for example, higher flame temperatures.

The foregoing detailed description of our invention and of preferred embodiments as to products, compositions and processes, is illustrative of specific embodiments only. It is to be understood, however, that additional embodiments described herein, together with those additional embodiments, are considered to be within the scope of the present invention.

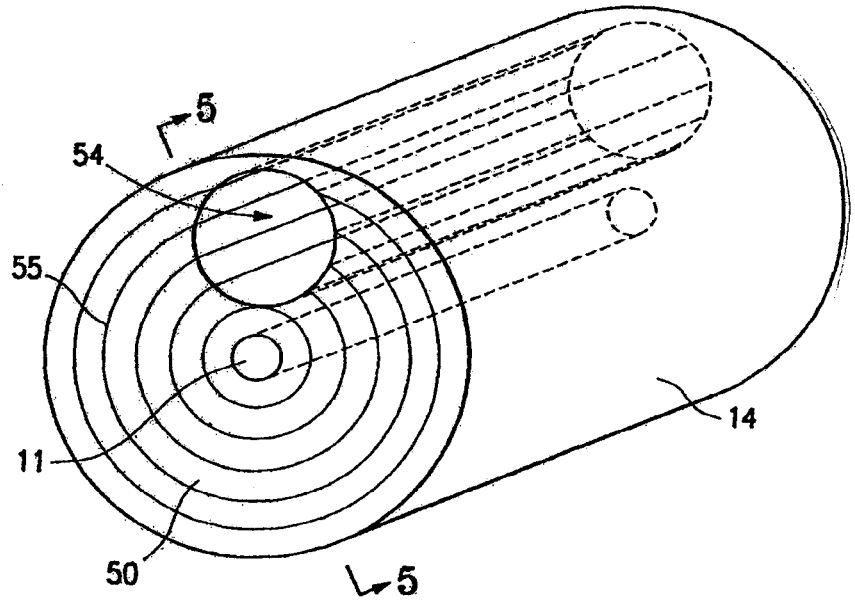

What is claimed is:

1. A method of manufacturing a glass core preform, the method comprising the steps of:
    (a) depositing at least a part of a silica based reaction product on a bait rod to form a porous core body that surrounds at least a portion of the bait rod;
    (b) boring a porous core mandrel without a centerline hole region from the porous core body, the porous core mandrel being bored substantially parallel to an axis of the bait rod;
    (c) depositing a silica-based material on the porous core mandrel to form a porous core preform; and
    (d) drying and sintering at least a portion of the preform to form a glass core preform.

2. The method of claim 1 wherein said drying and sintering steps are preformed under conditions suitable to result in a solid glass core preform suitable to make an optical fiber having an attenuation of less than about 0.35 dB/km at a wavelength of 1380 nm.

3. The method of claim 1 wherein said drying and sintering steps are preformed under conditions suitable to result in a solid glass core preform suitable to make an optical fiber having an attenuation of less than about 0.31 dB/km at a wavelength of 1380 nm.

4. The method of claim 1 further comprising a step of heat-treating the porous core body prior to boring.

5. The method of claim 4 wherein the heat treating step comprises drying by passing a suitable gas mixture through the porous core body.

6. The method of claim 1 wherein said porous core mandrel is chemically dried in a drying furnace.

7. The method of claim 1 wherein said porous core mandrel is chemically etched on the surface.

8. The method of claim 1 further comprising the steps of:
    positioning said glass core preform in a furnace;
    heating said glass core preform within said furnace; and
    drawing said glass core preform into a glass core rod having an outside diameter smaller than the outside diameter of said glass core preform.

9. The method of claim 1 wherein said porous core body is obtained by chemically reacting at least some of the constituents of a moving fluid mixture comprising at least one glass-forming precursor compound and an oxidizing medium, the reaction resulting in the formation of a silica-based reaction product.

10. The method of claim 1 further comprising the step of attaching a handle to the porous core mandrel, wherein the handle remains attached during steps (c) and (d).

11. The method of claim 10 further comprising depositing the silica-based material on at least a portion of the handle attached to the porous core mandrel to form the porous core preform.

12. A method of manufacturing a glass optical waveguide preform, the method comprising the steps of:
(a) depositing at least a part of a silica based reaction product on a bait rod to form a porous core body that surrounds at least a portion of the bait rod;
(b) boring a porous core mandrel without a centerline hole region from the porous core body, the porous core mandrel being bored substantially parallel to an axis of the bait rod;
(c) depositing a silica-based material on the porous core mandrel to form a porous optical waveguide preform; and
(d) drying and sintering at least a portion of the preform to form a glass optical waveguide preform.

13. The method of claim 12 wherein said drying and sintering steps are preformed under conditions suitable to result in a solid glass core preform suitable to make an optical fiber having an attenuation of less than about 0.35 dB/km at a wavelength of 1380 nm.

14. The method of claim 12 wherein said drying and sintering steps are preformed under conditions suitable to result in a solid glass core preform suitable to make an optical fiber having an attenuation of less than about 0.31 dB/km at a wavelength of 1380 nm.

15. The method of claim 12 wherein the porous core body is heat treated prior to boring.

16. The method of claim 15 wherein the heat treating step comprises drying by passing a suitable gas mixture through the porous core body.

17. The method of claim 12 wherein said porous core mandrel is chemically dried in a drying furnace.

18. The method of claim 12 wherein said porous core mandrel is chemically etched on the surface.

19. The method of claim 12 wherein said porous core body is obtained by chemically reacting at least some of the constituents of a moving fluid mixture comprising at least one glass-forming precursor compound and an oxidizing medium, the reaction resulting in the formation of a silica-based reaction product.

20. The method of claim 12 further comprising the step of attaching a handle to the porous core mandrel, wherein the handle remains attached during steps (c) and (d).

21. The method of claim 20 further comprising depositing the silica-based material on at least a portion of the handle attached to the porous core mandrel to form the porous optical waveguide preform.

22. A method of manufacturing a glass core preform, the method comprising the steps of:
(a) depositing at least a part of a silica based reaction product on a bait rod to form a porous core body, wherein the porous core body has a density of at least about 0.4 g/cm3;
(b) boring a porous core mandrel without a centerline hole region from the porous core body, the porous core mandrel being bored substantially parallel to an axis of the bait rod;
(c) depositing a silica-based material on the porous core mandrel to form a porous core preform; and
(d) drying and sintering at least a portion of the preform to form a glass core preform.

23. The method of claim 22, wherein the porous core body has a density between about 0.4 g/cm3 and about 0.7 g/cm3.

24. The method of claim 22 wherein said drying and sintering steps are preformed under conditions suitable to result in a solid glass core preform suitable to make an optical fiber having an attenuation of less than about 0.35 dB/km at a wavelength of 1380 nm.

25. The method of claim 22 wherein said drying and sintering steps are preformed under conditions suitable to result in a solid glass core preform suitable to make an optical fiber having an attenuation of less than about 0.31 dB/km at a wavelength of 1380 nm.

26. The method of claim 22 further comprising a step of heat-treating the porous core body prior to boring.

27. The method of claim 26 wherein the heat treating step comprises drying by passing a suitable gas mixture through the porous core body.

28. The method of claim 22 wherein said porous core mandrel is chemically dried in a drying furnace.

29. The method of claim 22 wherein said porous core mandrel is chemically etched on the surface.

30. The method of claim 22 further comprising the steps of:
positioning said glass core preform in a furnace;
heating said glass core preform within said furnace; and
drawing said glass core preform into a glass core rod having an outside diameter smaller than the outside diameter of said glass core preform.

31. The method of claim 22 wherein said porous core body is obtained by chemically reacting at least some of the constituents of a moving fluid mixture comprising at least one glass-forming precursor compound and an oxidizing medium, the reaction resulting in the formation of a silica-based reaction product.

32. The method of claim 22 further comprising the step of attaching a handle to the porous core mandrel, wherein the handle remains attached during steps (c) and (d).

33. The method of claim 32 further comprising depositing the silica-based material on at least a portion of the handle attached to the porous core mandrel to form the porous core preform.

34. A method of manufacturing a glass optical waveguide preform, the method comprising the steps of:
(a) depositing at least a part of a silica based reaction product on a bait rod to form a porous core body, wherein the porous core body has a density of at least about 0.4 g/cm3;
(b) boring a porous core mandrel without a centerline hole region from the porous core body, the porous core mandrel being bored substantially parallel to an axis of the bait rod;
(c) depositing a silica-based material on the porous core mandrel to form a porous optical waveguide preform; and
(d) drying and sintering at least a portion of the preform to form a glass optical waveguide preform.

35. The method of claim 34, wherein the porous core body has a density between about 0.4 g/cm3 and about 0.7 g/cm3.

36. The method of claim 34 wherein said drying and sintering steps are preformed under conditions suitable to result in a solid glass core preform suitable to make an optical fiber having an attenuation of less than about 0.35 dB/km at a wavelength of 1380 nm.

37. The method of claim 34 wherein said drying and sintering steps are preformed under conditions suitable to result in a solid glass core preform suitable to make an optical fiber having an attenuation of less than about 0.31 dB/km at a wavelength of 1380 nm.

38. The method of claim 34 wherein the porous core body is heat treated prior to boring.

39. The method of claim 38 wherein the heat treating step comprises drying by passing a suitable gas mixture through the porous core body.

40. The method of claim 34 wherein said porous core mandrel is chemically dried in a drying furnace.

41. The method of claim 34 wherein said porous core mandrel is chemically etched on the surface.

42. The method of claim 34 wherein said porous core body is obtained by chemically reacting at least some of the constituents of a moving fluid mixture comprising at least one glass-forming precursor compound and an oxidizing medium, the reaction resulting in the formation of a silica-based reaction product.

43. The method of claim 34 further comprising the step of attaching a handle to the porous core mandrel, wherein the handle remains attached during steps (c) and (d).

44. The method of claim 43 further comprising depositing the silica-based material on at least a portion of the handle attached to the porous core mandrel to form the porous optical waveguide preform.

* * * * *

UNITED STATES PATENT AND TRADEMARK OFFICE
CERTIFICATE OF CORRECTION

| | | |
|---|---|---|
| PATENT NO. | : 7,930,905 B2 | |
| APPLICATION NO. | : 10/961284 | |
| DATED | : April 26, 2011 | |
| INVENTOR(S) | : Stirling et al. | |

It is certified that error appears in the above-identified patent and that said Letters Patent is hereby corrected as shown below:

The Title Page, showing an illustrative figure should be deleted and substituted therefor the attached Title Page.

Delete Drawing Sheets 1-8 and substitute therefor the Drawing Sheets consisting of Figs 1-8 as shown on the attached pages.

Signed and Sealed this
Tenth Day of January, 2012

David J. Kappos
*Director of the United States Patent and Trademark Office*

United States Patent
Stirling et al.

(12) United States Patent
(10) Patent No.: US 7,930,905 B2
(45) Date of Patent: Apr. 26, 2011

(54) METHODS FOR MANUFACTURING LOW WATER PEAK OPTICAL WAVEGUIDE INCORPORATING A POROUS CORE MANDREL

(75) Inventors: David McDonald Stirling, Killara (AU); Franklin W. Dabby, Los Angeles, CA (US); Gordon Randall Gould, Oxnard, CA (US); Henry Willner, Long Beach, CA (US)

(73) Assignee: ASI/Silica Machinery, LLC, North Hills, CA (US)

( * ) Notice: Subject to any disclaimer, the term of this patent is extended or adjusted under 35 U.S.C. 154(b) by 0 days.

(21) Appl. No.: 10/961,284

(22) Filed: Oct. 8, 2004

(65) Prior Publication Data
US 2006/0075786 A1 Apr. 13, 2006

(51) Int. Cl.
C03B 37/014 (2006.01)

(52) U.S. Cl. ............... 65/393; 65/439; 65/421; 65/422; 65/426; 65/427

(58) Field of Classification Search ............ 65/439, 65/393, 421, 422, 417, 426, 427, 429, 395, 65/440
See application file for complete search history.

(56) References Cited

U.S. PATENT DOCUMENTS

| | | | |
|---|---|---|---|
| 4,494,968 A * | 1/1985 | Bhagavatula et al. | 65/386 |
| 4,501,601 A * | 2/1985 | Haupt | 65/399 |
| 4,810,276 A * | 3/1989 | Gilliland | 65/421 |
| 6,477,305 B1 * | 11/2002 | Berkey et al. | 385/123 |
| 6,931,188 B2 * | 8/2005 | Kersey et al. | 385/125 |
| 2007/0062337 A1 * | 3/2007 | Dai et al. | 76/108.1 |

FOREIGN PATENT DOCUMENTS

| JP | 61291432 A | * | 12/1986 |
|---|---|---|---|
| JP | 63017236 A | * | 1/1988 |
| JP | 04325431 A | * | 11/1992 |

OTHER PUBLICATIONS

T. Moriyama, et al., "Optical Fibres & Waveguides", Electronics Letters, vol. 16 No. 18, dated Aug. 28, 1980, pp. 698-699.
International Search Report and Written Opinion for International Application No. PCT/US05/35952 completed Jul. 13, 2006.

* cited by examiner

Primary Examiner — Queenie Dehghan
(74) Attorney, Agent, or Firm — Alston & Bird LLP

(57) ABSTRACT

A method of manufacturing a cylindrical glass optical waveguide preform having a low water content centerline region, for use in the manufacture of optical waveguide fiber, is disclosed. The centerline region of the glass optical waveguide preform has a water content sufficiently low such that an optical waveguide fiber producible from the glass optical waveguide preform of the present invention exhibits an optical attenuation of less than about 0.35 dB/km, and preferably less than about 0.31 dB/km, at a measured wavelength of 1380 nm. Method of manufacture of a porous core mandrel used in the manufacture of such a glass optical waveguide preform is also disclosed.

44 Claims, 8 Drawing Sheets